(12) United States Patent
Kim et al.

(10) Patent No.: US 10,882,285 B2
(45) Date of Patent: Jan. 5, 2021

(54) PROTECTIVE FILM FOR ELECTRONIC DEVICE AND WINDOW ASSEMBLY USING THE SAME

(71) Applicants: Samsung Electronics Co., Ltd., Gyeonggi-do (KR); Daehyunst Co., Ltd., Gyeonggi-do (KR)

(72) Inventors: Younggyun Kim, Gyeonggi-do (KR); Choontaek Shim, Gyeonggi-do (KR); Sangil Hwang, Gyeonggi-do (KR); Jeeyoung Oh, Gyeonggi-do (KR); Hoyoung Lee, Seoul (KR); Jaeseon Jeon, Gyeonggi-do (KR); Jaehyeok Heo, Gyeonggi-do (KR)

(73) Assignees: Samsung Electronics Co., Ltd., Suwon-si (KR); Daehyunst Co. Ltd., Hwaseong-si (KR)

( * ) Notice: Subject to any disclaimer, the term of this patent is extended or adjusted under 35 U.S.C. 154(b) by 0 days.

(21) Appl. No.: 15/899,804

(22) Filed: Feb. 20, 2018

(65) Prior Publication Data
US 2018/0272669 A1    Sep. 27, 2018

(30) Foreign Application Priority Data
Mar. 21, 2017    (KR) .......................... 10-2017-0035358

(51) Int. Cl.
*B32B 27/08* (2006.01)
*B32B 7/12* (2006.01)
(Continued)

(52) U.S. Cl.
CPC ............... *B32B 27/08* (2013.01); *B32B 7/12* (2013.01); *B32B 17/10018* (2013.01);
(Continued)

(58) Field of Classification Search
CPC ......... B32B 27/08; B32B 27/308; B32B 7/12; B32B 7/26; B32B 17/10018;
(Continued)

(56) References Cited

U.S. PATENT DOCUMENTS 7,939,165 B2 *   5/2011   Chiu ........................ B32B 7/12
                                                                     427/385.5
2011/0267793 A1 *  11/2011   Cohen ................ B29C 63/0047
                                                                     361/807

(Continued)

FOREIGN PATENT DOCUMENTS

JP        2012-237965 A    12/2012
JP        3207091 U         9/2016
(Continued)

OTHER PUBLICATIONS

Machine translation of Korean document 20140022321 A (Year: 2014).*

(Continued)

*Primary Examiner* — Patricia L. Nordmeyer
(74) *Attorney, Agent, or Firm* — Cha & Reiter, LLC.

(57) ABSTRACT

A protective film for an electronic device is introduced. The protective film may comprises a deformable outer layer formed with a synthetic resin; a deformable modified material layer attached with a lower surface of the deformable outer layer, wherein the deformable modified layer is configured to be hardened responsive to receipt of an external stimuli; a deformable inner layer formed with a synthetic resin, attached with a lower surface of the deformable modified material layer; and an adhesive layer adhering to a lower surface of the deformable inner layer. Further, various embodiments can be implemented according to the present disclosure.

20 Claims, 21 Drawing Sheets

(51) Int. Cl.
  *C09J 7/29* (2018.01)
  *C09J 7/22* (2018.01)
  *B32B 27/26* (2006.01)
  *B32B 27/30* (2006.01)
  *B32B 17/10* (2006.01)

(52) U.S. Cl.
  CPC ............ *B32B 27/26* (2013.01); *B32B 27/308* (2013.01); *C09J 7/22* (2018.01); *C09J 7/29* (2018.01); *B32B 2255/10* (2013.01); *B32B 2457/20* (2013.01); *C09J 2203/318* (2013.01); *C09J 2301/416* (2020.08); *C09J 2433/006* (2013.01)

(58) Field of Classification Search
  CPC .... B32B 2255/10; B32B 2457/20; C09J 7/29; C09J 7/22; C09J 2203/318; C09J 2205/31; C09J 2433/006
  See application file for complete search history.

(56) References Cited

U.S. PATENT DOCUMENTS

| | | | |
|---|---|---|---|
| 2012/0087072 A1* | 4/2012 | McGuire | B29C 63/0047 361/679.01 |
| 2013/0329173 A1 | 12/2013 | Jung | |
| 2014/0211316 A1* | 7/2014 | Furui | B32B 7/02 359/599 |
| 2014/0377520 A1 | 12/2014 | Chang | |
| 2017/0290182 A1* | 10/2017 | Roberts | C09J 7/29 |
| 2018/0224594 A1 | 1/2018 | Park et al. | |

FOREIGN PATENT DOCUMENTS

| | | |
|---|---|---|
| KR | 10-2011-0104761 A | 9/2011 |
| KR | 10-2014-0000145 A | 1/2014 |
| KR | 10-2014-0022321 A | 2/2014 |
| KR | 10-2016-0082395 A | 7/2016 |
| KR | 10-1657136 B1 | 9/2016 |
| KR | 10-1697049 B1 | 1/2017 |
| WO | 2014/021486 A1 | 2/2014 |

OTHER PUBLICATIONS

Machine Translation of KR 10-1697049, 8 pages. (Year: 2017).*
International Search Report dated May 18, 2018.
European Search Report dated Jan. 2, 2020.

* cited by examiner

PROTECTIVE FILM FOR ELECTRONIC DEVICE AND WINDOW ASSEMBLY USING THE SAME

CLAIM OF PRIORITY

This application claims priority from and the benefit under 35 U.S.C. § 119(a) of Korean Patent Application No. 10-2017-0035358 filed on Mar. 21, 2017, which is hereby incorporated by reference for all purposes as if fully set forth herein.

TECHNICAL FIELD

Various embodiments of the present invention relate to a protective film for protecting a window of an electronic device having a three-dimensional structure or curved surface. However, a window having a three-dimensional structure or a curved surface can be susceptible to slip when held by the user.

BACKGROUND

A window having a three-dimensional curved surface can be used in electronic devices in order to provide an appealing appearance of an electronic device. However, windows having a three-dimensional or curved surface can be susceptible to slippage when held by the user.

SUMMARY

If a conventional protective film is attached to a window having a curved surface, the protective film may separate from the curved part of the window. The conventional protective film may separate because an elastic restoring force of the protective film decreases an adhesive strength.

Various embodiments of the present invention can provide a protective film having an excellent adhesive strength at a curved part, because an elastic force is reduced from the protective film by attaching and deforming the protective film corresponding to a shape of the curved part and by hardening the protective film with external stimuli corresponding to the shape of the curved part.

A protective film for an electronic device in accordance with an embodiment of the present invention comprises: a deformable outer layer formed with a synthetic resin; a deformable modified material layer configured attached with a lower surface of the deformable outer layer, wherein the deformable modified layer is configured to be hardened responsive to receipt of an external stimuli; a deformable inner layer formed with a synthetic resin, attached with a lower surface of the deformable modified material layer; and an adhesive layer adhering a lower surface of the deformable inner layer to a window surface of the electronic device.

A windows assembly for an electronic device in accordance with an embodiment of the present disclosure may comprises a deformable outer layer formed with a synthetic resin; a deformable modified material layer attached to a lower surface of the outer layer, to have fluidity, wherein the deformable modified layer is configured to be hardened responsive to receipt of an external stimuli; a deformable inner layer formed with a synthetic resin, attached to a lower surface of the deformable modified material layer; an adhesive layer configured to be combined with a lower surface of the deformable inner layer; and a window layer configured to be combined with a lower surface of the adhesive layer and the electronic device, wherein the adhesive layer provides adhesive strength to a connection of the lower surface of the deformable inner layer and the window layer.

BRIEF DESCRIPTION OF THE DRAWINGS

The above and other aspects, features, and advantages of certain embodiment of the present invention will be more apparent from the following description taken in conjunction with the accompanying drawings, in which.

DETAILED DESCRIPTION

Figure 1:
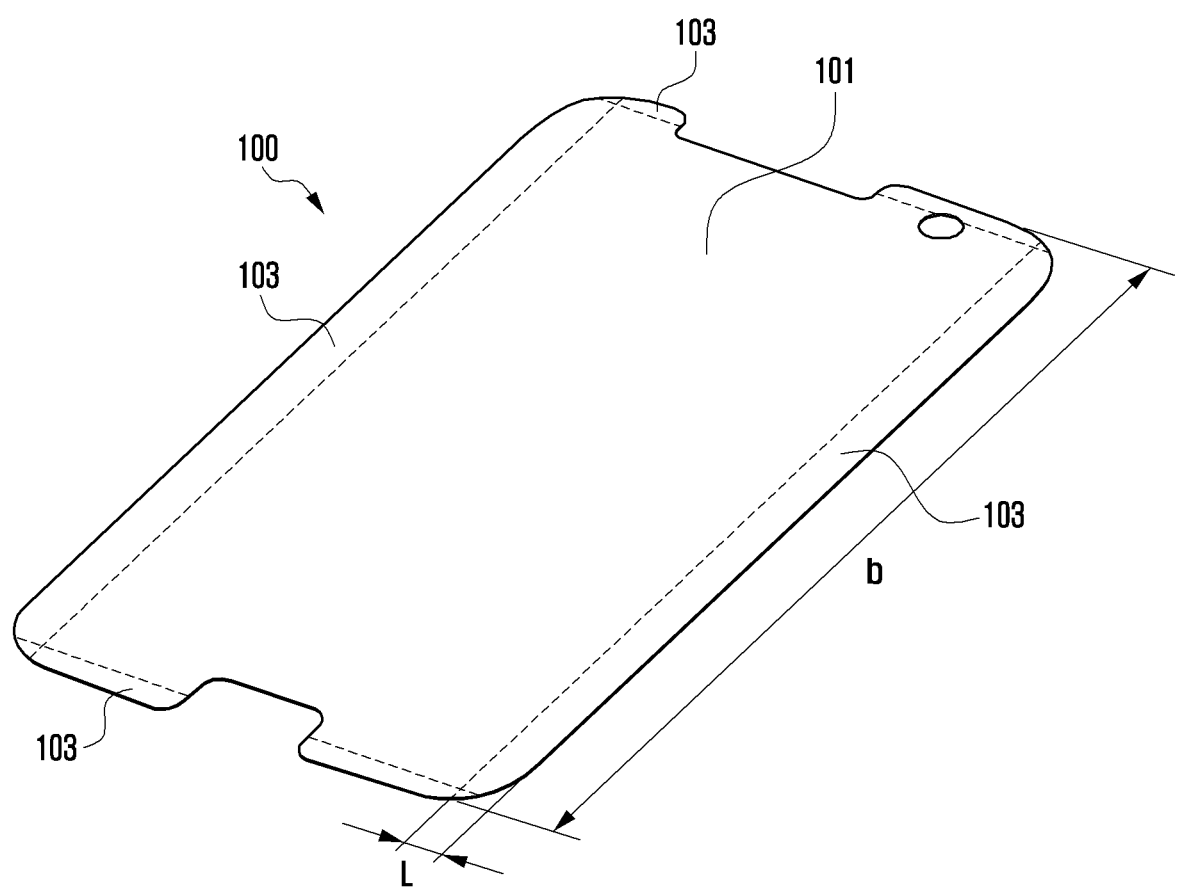
FIG. 1 is a perspective view illustrating a protective film for an electronic device according an embodiment of the present disclosure.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a TeleVision (TV), a Digital Video Disk (DVD) player, an audio device, various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

Figure 2A:
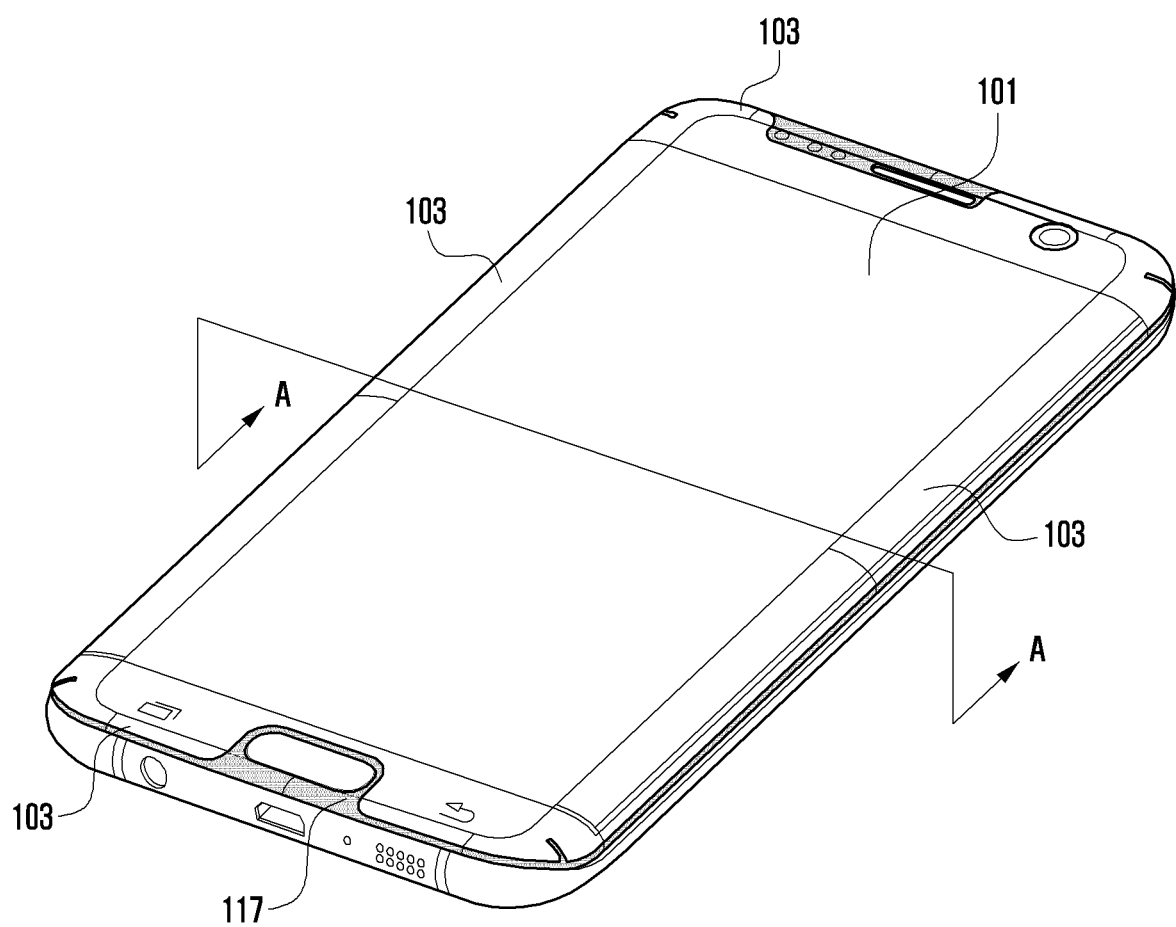
FIG. 2A illustrates a state of a protective film attached to an electronic device according to an embodiment of the present disclosure.
Figure 2B:
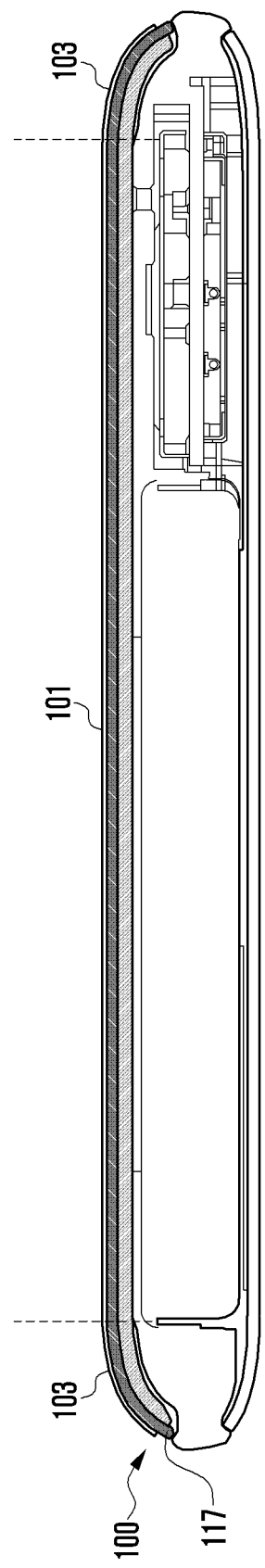
FIG. 2B illustrates a cross sectional view of an electronic device cut along a line A-A of FIG. 2A.

FIG. 1 is a perspective view illustrating a protective film 100 for an electronic device according an embodiment of the present invention; FIG. 2A illustrates the protective film 100 attached to an electronic device according to an embodiment of the present disclosure; and FIG. 2B illustrates a cross sectional view of an electronic device cut along a line A-A of FIG. 2A.

The protective film 100 for the electronic device may include a flat part 101 and a curved part 103 as shown in FIG. 1.

According to an embodiment, ends of the protective film 100 in a right/left direction or an upper/lower direction may deform corresponding to a curved part of a window 117 when attached to the window 117 of the electronic device as shown in FIG. 2A. A part deforming corresponding to the curved shape of the window 117 may correspond to the curved part 103, and the remaining part may correspond to the flat part 101.

An elastic force urges the protective film to restore to a flat shape. The elastic force (now referred to as a "restoring force") of the protective film urges the curved part 103 to move upwards and is opposite the, adhesive force between the curved part 103 and the window 117. This causes the adhesive strength between the curved part 103 and the window 117 to weaken. The adhesive strength can be determined according to a material of the adhesive layer (e.g., adhesive layer 113 of FIG. 3) or an application amount of adhesive.

The restoring force of the protective film can be expressed with a bending load of a strong body having a rectangular cross section as shown by the following formula.

Formula 1

$$P = 4 \times \frac{E \cdot I}{L} = \frac{E \cdot b \cdot h^3}{3 \cdot L},$$

$$I = \frac{b \cdot h^3}{12}$$

P: Bending load
E: Young's modulus
I: Inertia moment of rectangular cross section
L: Length of curved part
b: Length of protective film
h: Thickness of protective film With reference to Formula 1, if the adhesive strength is greater than the restoring force represented by a bending load, the curved part 103 of the protective film can remain attached to the curved part of the window 117.

In order to remain attached, the adhesive strength can either be increased or the restoring force of the protective film can be decreased. The amount of adhesive in the adhesive layer 113 (thickness of adhesive layer 113) is limited due to cost and size considerations. Accordingly, there are limits to increasing the adhesive force. The restoring force can be decreased by reducing the thickness of the protective film (variable "h"). However, the thickness of the protective film prevents external forces from cracking the window. Thus, reducing the thickness of the protective film makes the window more susceptible to cracking.

However, the restoring force can be reduced using a modified material layer 109 which will be described below. The modified material layer 109 hardens the deformed curved part of the protective film. As a result, the protective film 100 for an electronic device according to an embodiment of the present invention can maintain attachment to the curved part 103 without decreasing the thickness of the protective film, or increasing the thickness of the adhesive layer 113.

Figure 3:
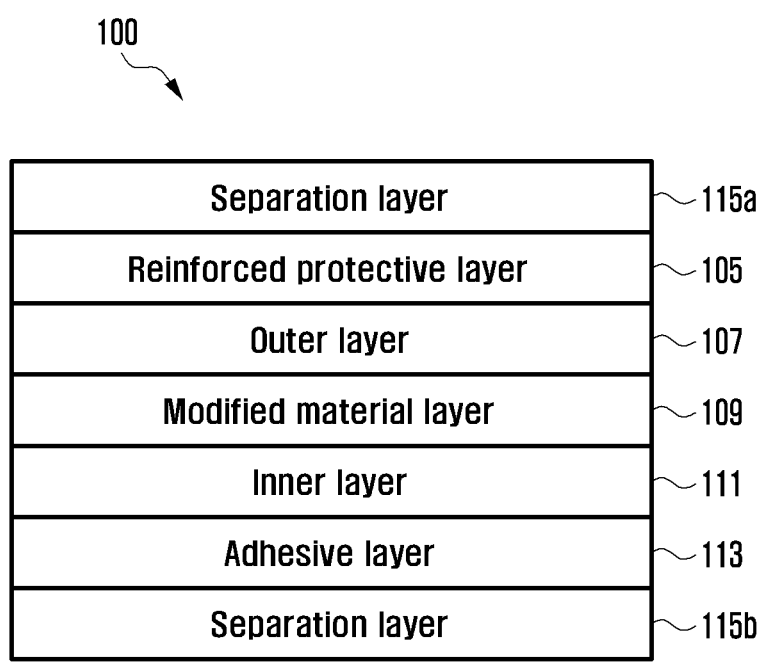
FIG. 3 is a cross sectional view illustrating a structure of a protective film for an electronic device according to an embodiments of the present disclosure.

FIG. 3 is a cross sectional view illustrating a structure of a protective film 100 cut along the line A-A for an electronic device according to an embodiments of the present disclosure.

The protective film 100 for an electronic device according to an embodiment of the present disclosure may include separation layers 115a and 115b, reinforced protective layer 105, outer layer 107, modified material layer 109, inner layer 111, and adhesive layer 113. A direction base of an upper surface and a lower surface described in the present disclosure is defined for easier understanding of the present disclosure, and is not an absolute direction base, and may indicate a relative location between components.

According to an embodiment, the outer layer 107 is provided as a base frame of the protective film. The material of the outer layer 107 can include, but is not limited to, polyethylene terephthalate (PET), polypropylene (PP), casting polypropylene (CPP), polyurethane (PU), or polyolefin (PO).

According to an embodiment, the reinforced protective layer 105 may be formed on an upper surface of the outer layer 107 in order to prevent scratch or stabbing by an external abrasion or stress. The reinforced protective layer 105 may be formed by applying and hardening a liquid material having a high surface hardness and durability, and a resin composite of acryl, urethane, or silicon family may be used as the reinforced protective layer 105.

According to an embodiment, the modified material layer 109 is formed at the lower surface of the outer layer 107 and may include a material that can be deformed with fluidity at room temperature and hardened by maintaining a deformed state if a specific external stimuli is applied. For example, the specific external stimuli may be the radiation of ultraviolet light.

According to an embodiment, the curved part 103 may be deformed according to a shape of the window 117 when the protective film is attached to the window 117 of the electronic device. However the restoring force can be drastically reduced, if not eliminated, by hardening with the radiation of ultraviolet light in the deformed state. By this, the attached state can be maintained at the curved part of the window 117.

According to an embodiment, the modified material layer 109 can be manufactured in a variety of ways. According to an embodiment, a photo-reactive oligomer enabling an ultraviolet hardening reaction of an acrylic resin can be added to the modified layer. According to another embodiment, a chemical combination mixing an acrylic resin with methacryloyloxyethyl isocyanate (MOI) when synthesizing the acrylic resin can be used.

In the embodiment where a photo-reactive oligomer enabling an ultraviolet hardening reaction of an acrylic resin is added to the modified layer, the modified material layer 109 can be formed by synthesizing a general purpose acrylic resin such as methacrylate, ethyl acrylate, butyl acrylate, 2-ethylhexyl acrylate, or methyl methacrylate with condensation polymerization and addition polymerization, and by adding a photo-reactive oligomer and a photo-initiator initiating an ultraviolet hardening reaction.

According to an embodiment, the acryl resin may be a solvent-based acrylic resin having a glass transition point (Tg) lower than room temperature. According, the material has the flexibility to be deformed along a curved surface of the window 117.

According to an embodiment, the photo-reactive oligomer can be used by mixing one or more oligomers selected from oligomers having functional groups of 2-functional, 3-functional, 5-functional, 6-functional, or 10-functional.

According to an embodiment, the 2-functional oligomer may include 1,6-hexanediol diacrylate (HDDA), 1,4-butanediol diacrylate (BDDA), tripropylene glycol diacrylate (TPGDA), dipropylene glycol diacrylate (DGD), triethylene glycol diacrylate (TGD), or tricyclodecane dimethanol diacrylate (TCDDA).

According to an embodiment, the 3-functional oligomer may include trimethylolpropane triacrylate (TMPTA), trimethylolpropane trimethacrylate (TMPTMA), or pentaerythritol triacrylate (PETA).

According to an embodiment, the 5-functional oligomer may include pentaerythritol tetraacrylate (PETA), or dipentaerythritol pentaacrylate (DPPA).

According to an embodiment, the 6-functional oligomer may include dipentaerythritol hexaacrylate (DPHA).

According to an embodiment, the 10-functional oligomer may include multifunctional aliphatic multifunctional acrylate.

Such a photo-reactive oligomer is not limited to the above examples. Further, the type and content of the photo-reactive oligomer can be adjusted according to the number of functional groups.

About 5~50 parts by weight of the photo-reactive oligomer may be added based on 100 parts by weight of acrylic resin in manufacturing the modified material layer 109 of the protective film 100 for an electronic device according to an embodiment of the present disclosure.

According to an embodiment, the photo-initiator is used to initiate a polymerization reaction by absorbing energy from a visible light or an illumination light. For example, the photo-initiator may be used by mixing one or more initiators selected from long wavelength reactive initiators such as 2,4,6-trimethylbenzoyl-diphenyl-diphenyl phosphine oxide (TPO), 4,4'-bis(diethylamino)benzophenone), or phenyl bis (2,4,6-trimethyl benzoyl) phosphine oxide, which can perform an initialization reaction by using a small amount of ultraviolet light (mostly long wavelength ultraviolet light) included in a visible light or an illumination light. About 1~5 parts by weight of the photo-initiator may be used corresponding to 100 parts by weight of the acryl resin 100.

According to the embodiment where a chemical combination mixing an acrylic resin with methacryloyloxyethyl isocyanate (MOI) when synthesizing the acrylic resin can be used, the modified material layer 109 is manufactured by synthesizing an all-in-one adhesive acrylic resin enabling ultraviolet hardening by introducing ethylene unsaturation in a polymer chain through an addition reaction of methacryloyloxyethyl isocyanate (MOI) and mixing a photo-initiator to the acrylic resin.

According to an embodiment, in the operation of synthesizing the acryl resin, about 7~12 parts by weight of MOI and 100 parts by weight of acryl resin may be mixed and synthesized, and the modified material layer 109 can be formed by mixing a photo-initiator with the synthesized acrylic resin.

According to an embodiment, the photo-initiator may be the same one used in the other embodiment.

According to an embodiment, the inner layer 111 can take a role of a link between the modified material layer 109 and an adhesive layer 113, which will be described later. Because the modified material layer 109 is formed with an acrylic resin and a surface of the adhesive layer 113 is stabilized with a silicon material, the two layers can be split if combined directly. For example, if the inner layer 111 is disposed between the modified material layer 109 and the adhesive layer 113, an adhesive between two layers can be increased.

According to an embodiment, if the adhesive layer 113 is applied to the modified material layer 109 having fluidity before hardening, the flatness of the adhesive layer 113 may decline, however the adhesive layer 113 can be formed uniformly by applying the adhesive layer 113 to the inner layer 111.

According to an embodiment, the inner layer 111 may be formed with polyethylene terephthalate (PET), polypropylene (PP), casting polypropylene (CPP), polyurethane (PU), or polyolefin (PO).

According to an embodiment, the adhesive layer 113 may be formed at another surface of the inner layer 111 with a pressure sensitive adhesive (PSA) in order to attach or detach to/from a display surface, and an acrylic adhesive or a silicon adhesive can be used for the adhesive layer 113.

According to an embodiment, when considering material characteristics of the outer layer 107 such as a Young's modulus value, length of the protective film b, or length of curved part L based on the formula of restoring force, the outer layer can be formed within a thickness range greater than about 10 μm and less than about 50 μm. As another example, the reinforced protective layer 105, outer layer 107, modified material layer 109, inner layer 111, and adhesive layer 113 may be formed within a total thickness range greater than about 60 μm and less than about 135 μm. For example, the above thickness ranges are calculated by considering that the curved part 103 of the protective film cannot maintain an attached state with the windows 117 if the restoring force greater than 400 gf/in.

The outer layer 107, and inner layer 111 can be deformable. The modified material layer 109 is deformable, but configured to harden in response to receipt of external stimuli, such as radiation from UV light.

According to an embodiment, the separation layers 115a and 115b take a role of protecting the adhesive layer 113 and the reinforced protective layer 105 until the protective film 100 is attached to an electronic device. The separation layers may be disposed such that the separation layers can be easily split and removed before attaching to the electronic device and an attaching location of the protective film 100 can be easily determined in relation of the window 117 of the electronic device.

Figure 4:
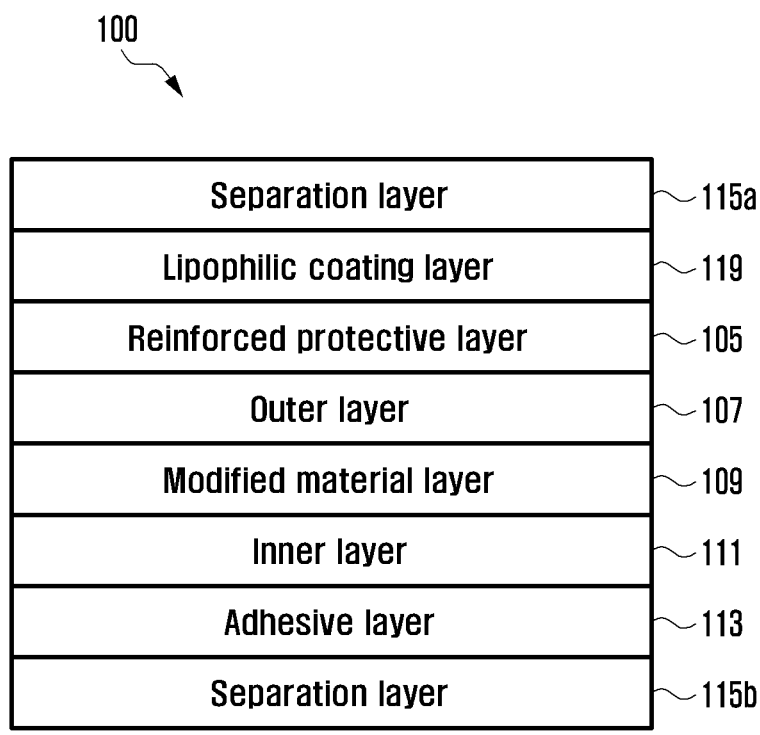
FIG. 4 and FIG. 5 are cross sectional views illustrating a structure of a protective film for an electronic device according to another embodiment of the present disclosure.

FIG. 4 is a cross sectional view illustrating a structure of a protective film 100 cut along the line A-A of FIG. 2A for an electronic device according to further another embodiment of the present disclosure.

FIG. 4 illustrates a sectional view illustrating a structure of a protect film 100 for an electronic device cut along the line A-A of FIG. 2A according to another embodiment of the present disclosure. According to an embodiment, the protective film 100 for the electronic device may have a first coating layer added to the protective film 100 for the electronic device of FIG. 3.

According to an embodiment of the present disclosure with reference to FIG. 4, the lipophilic coating layer 119 may be an invisible fingerprint (IF) coating layer. The lipophilic coating layer can be applied between the reinforced protective layer 105 and the separation layer 115a. Because the layer 119 is lipophilic, oil contaminants transferred from a user operation may become invisible by diffusing the oil contaminants.

Figure 5:
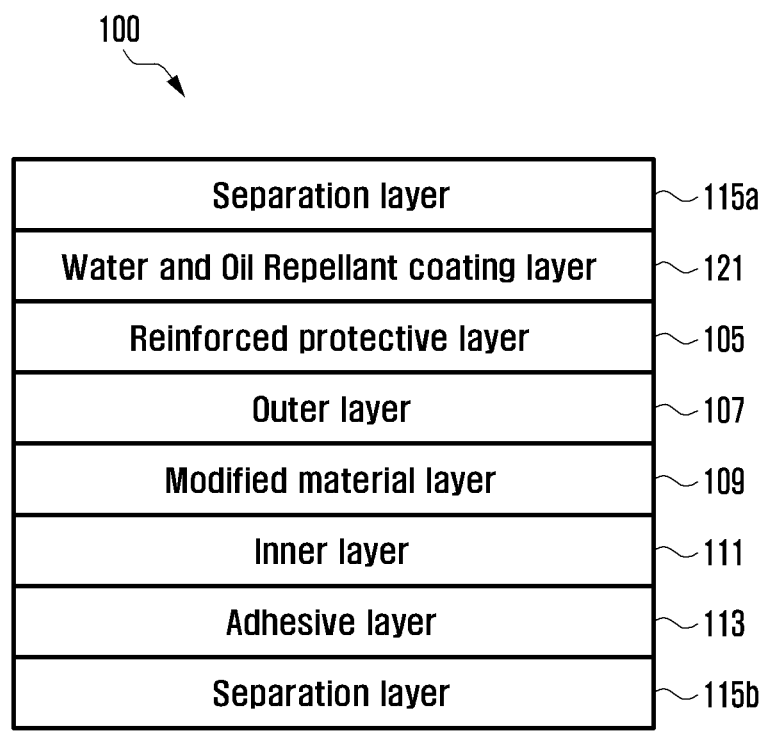

FIG. 5 is a cross sectional view illustrating a structure of a protective film 100 cut along the line A-A of FIG. 2A for an electronic device according to further another embodiment of the present disclosure. According to an embodiment, the protective film 100 may have a second coating layer added to the protective film 100 of FIG. 3.

According to an embodiment of the present disclosure with reference to FIG. 5, the coating layer 121 may be an anti-fingerprint (AF) water and oil repellent coating layer. The water and oil repellent layer 121 may be applied between the upper surface of the reinforced protective layer 105 and the separation layer 115a. The water and oil repellent layer 121 can avoid a transfer of oil contaminant to the protective film for an electronic device although a user contacts the protective film.

Figure 6:
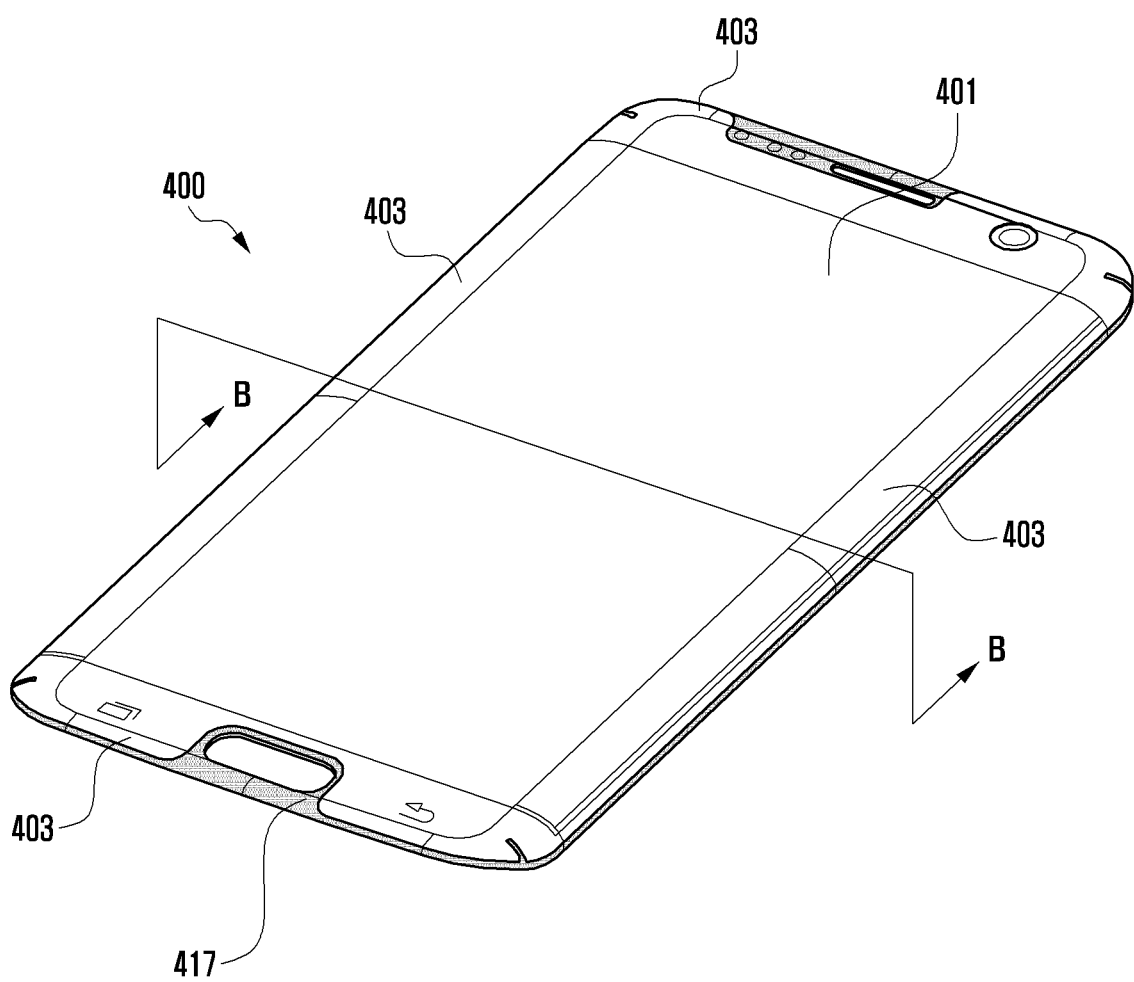
FIG. 6 is a perspective view illustrating a window assembly for an electronic device according to further another embodiment of the present disclosure.

FIG. 6 is a perspective view illustrating a window assembly for an electronic device according to further another embodiment of the present disclosure.

According to an embodiment, a window assembly for an electronic device can be produced by attaching a protective film 400 to a window of the electronic device disposed at the front or rear surface of the electronic device as a component of the electronic device.

The protective film 400 for an electronic device can be supplied to a consumer as a basic specification or, if necessary, the attachment of the protective film may be determined by the customer in order to satisfy various consumer preferences.

Figure 7:
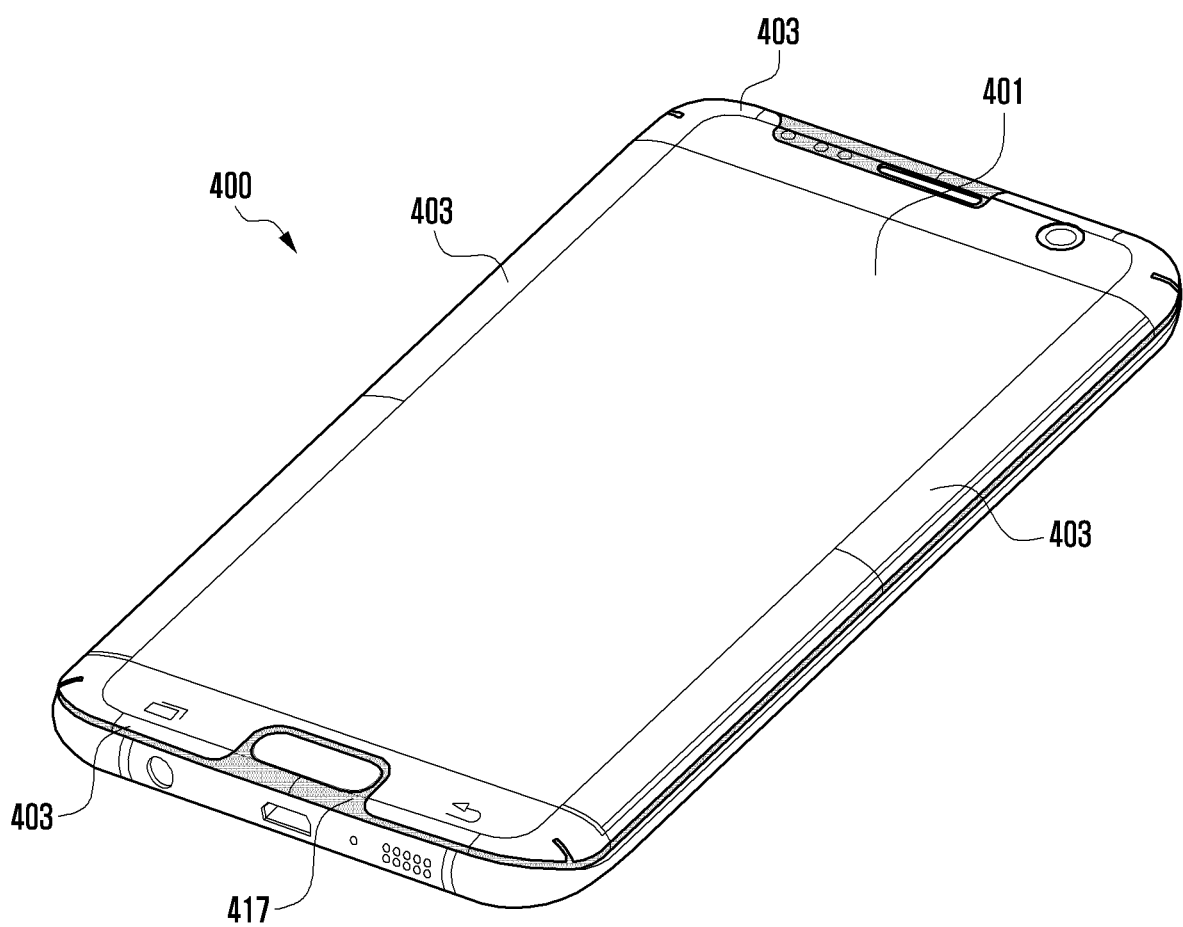
FIG. 7 illustrates an electronic device attached with a protective film according to further another embodiment of the present disclosure.

FIG. 7 illustrates an electronic device 500 attached with a protective film according to further another embodiment of the present disclosure.

The protective film 400 (refer to FIG. 6) for an electronic device according to another embodiment of the present disclosure can be supplied by attaching the protective film to the electronic device.

As shown in FIG. 7, the protective film 400 (refer to FIG. 6) for an electronic device can be supplied to a consumer as a basic specification of the electronic device or, if necessary, the attachment of the protective film may be determined by the customer in order to satisfy various consumer preferences.

Figure 8:
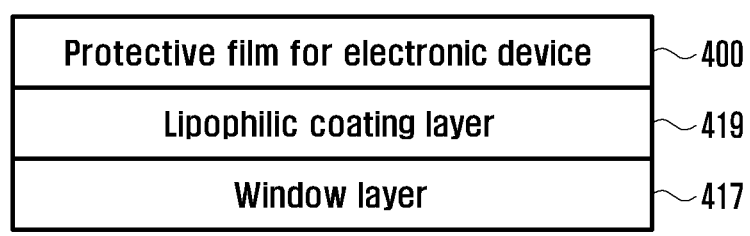
FIG. 8 and FIG. 9 are cross sectional views illustrating a structure of a window assembly for an electronic device according to further another embodiment of the present disclosure.
Figure 9:
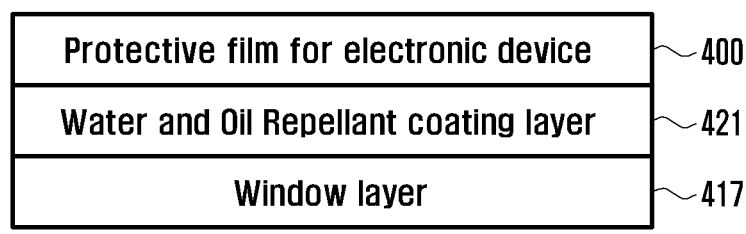

FIGS. 8 and 9 are cross sectional views illustrating a structure of a window assembly cut along the line B-B of FIG. 6 for an electronic device according to further another embodiment of the present disclosure. The protective film 400 illustrated in FIGS. 8 and 9 may be one of the protective films 100 illustrated in FIGS. 3 to 5.

The window layer 417 of the window assembly for an electronic device illustrated in FIG. 8 according to further another embodiment of the present disclosure may a window installed at the rear surface of the electronic device.

According to an embodiment, the layer 419 may be property lipophilic coating layer 419. The lipophilic coating layer 419 weakens the adhesive strength between the adhesive layer 113 (refer to FIGS. 3 to 5) and the window layer 417, therefore making it difficult to maintain an attached state at a curved part of a window. The protective film 400 for an electronic device according to the present disclosure can reduce the restoring force of the protective film by hardening the modified material layer 109 (refer to FIGS. 3 to 5), and can maintain attachment of the protective film at the curved part of the window.

The window layer 417 of the window assembly for an electronic device illustrated in FIG. 9 according to further another embodiment of the present disclosure may be a window installed at the front surface of the electronic device.

According to an embodiment, the layer 421 may be an AF (anti-fingerprint) water and oil repellent coating layer. The water and oil repellent coating layer 421 can weaken the adhesive strength between the adhesive layer 113 (refer to FIGS. 3 to 5) and the window layer 417, therefore making it difficult to maintain an attachment at a curved part of a window. The protective film 400 for an electronic device according to the present disclosure can reduce the restoring force of the protective film by hardening the modified material layer 109 (refer to FIGS. 3 to 5), and can maintain attachment of the protective film at the curved part of the window.

A protective film for an electronic device in accordance with an embodiment of the present invention comprises: a deformable outer layer formed with a synthetic resin; a deformable modified material layer configured attached with a lower surface of the deformable outer layer, wherein the deformable modified layer is configured to be hardened responsive to receipt of an external stimuli; a deformable inner layer formed with a synthetic resin, attached with a lower surface of the deformable modified material layer; and an adhesive layer adhering a lower surface of the deformable inner layer to a window surface of the electronic device.

The protective film may further comprise a reinforced protective layer formed on an upper surface of the outer layer with a material having a higher strength than the outer layer.

In the protective film, the external stimuli can comprise ultraviolet light radiation.

The deformable modified material layer may comprises an acrylic resin having a glass transition point lower than room temperature, a photo-reactive oligomer configured to be hardened by an ultraviolet light, and a photo-initiator configured to initiate an ultraviolet curing reaction.

The deformable modified material layer may comprise 100 parts by weight of the acryl resin 100, 5~50 parts by weight of the photo-reactive oligomer, and 1~5 parts by weight of the photo-initiator.

The deformable modified material layer may comprise an acrylic resin having a glass transition point lower than room temperature, metacryloyloxyethyl isocyanate, and photo-initiator configured to initiate an ultraviolet curing reaction.

The protective film may further comprise a separation layer configured to adhere to the upper surface of the reinforced protective layer and the lower surface of the adhesive layer in a separable form.

The protective film may further comprise a lipophilic coating layer configured to be located on the upper surface of the reinforced protective layer.

The protective film may further comprise a water and oil repellent coating layer configured to be located on the upper surface of the reinforced protective layer.

In the protective film, the deformable outer layer is formed with a thickness greater than 10 μm and less than 50 μm.

In the reinforced protective layer, the deformable outer layer, the deformable modified material layer, the deformable inner layer, and the adhesive layer may be formed to have a total thickness greater than 60 μm and less than 135 μm.

A windows assembly for an electronic device in accordance with an embodiment of the present disclosure may comprises a deformable outer layer formed with a synthetic resin; a deformable modified material layer attached to a lower surface of the outer layer, to have fluidity, wherein the deformable modified layer is configured to be hardened responsive to receipt of an external stimuli; a deformable inner layer formed with a synthetic resin, attached to a lower surface of the deformable modified material layer; an adhesive layer configured to be combined with a lower surface of the deformable inner layer; and a window layer configured to be combined with a lower surface of the adhesive layer and the electronic device, wherein the adhesive layer provides adhesive strength to a connection of the lower surface of the deformable inner layer and the window layer.

The window assembly may further comprises a reinforced protective layer formed on an upper surface of the deformable outer layer, the reinforced protected layer comprising a material having a higher strength than the deformable outer layer.

In the windows assembly, the external stimuli may comprise ultraviolet light radiation.

The deformable modified material layer may comprise an acrylic resin having a glass transition point lower than room temperature, a photo-reactive oligomer configured to be hardened by an ultraviolet light, and a photo-initiator configured to initiate an ultraviolet curing reaction.

The deformable modified material layer may comprise 100 parts by weight of the acryl resin 100, 5~50 parts by weight of the photo-reactive oligomer, and 1~5 parts by weight of the photo-initiator.

The deformable modified material layer may comprise an acrylic resin having a glass transition point lower than room temperature, metacryloyloxyethyl isocyanate, and photo-initiator configured to initiate an ultraviolet curing reaction.

The window assembly may further comprise a separation layer configured to adhere to the upper surface of the reinforced protective layer in a separable form.

The window assembly may further comprise a lipophilic first coating layer located on the upper surface of the reinforced protective layer.

The window assembly may further comprise a water and oil repellant second coating layer located between the adhesive layer and the window layer.

The deformable outer layer may be formed with a thickness greater than 10 μm and less than 50 μm.

The reinforced protective layer, the deformable outer layer, the deformable modified material layer, the deformable inner layer, and the adhesive layer may be formed to have a total thickness greater than 60 μm and less than 135 μm.

An electronic device according to an embodiment of the invention comprises a protective film. The protective film comprises: a deformable outer layer formed with a synthetic resin; a deformable modified material layer attached with a lower surface of the deformable outer layer, wherein the deformable modified layer is configured to be hardened responsive to receipt of an external stimuli; a deformable inner layer formed with a synthetic resin, attached with a lower surface of the deformable modified material layer; and an adhesive layer adhering to a lower surface of the deformable inner layer.

Figure 10:
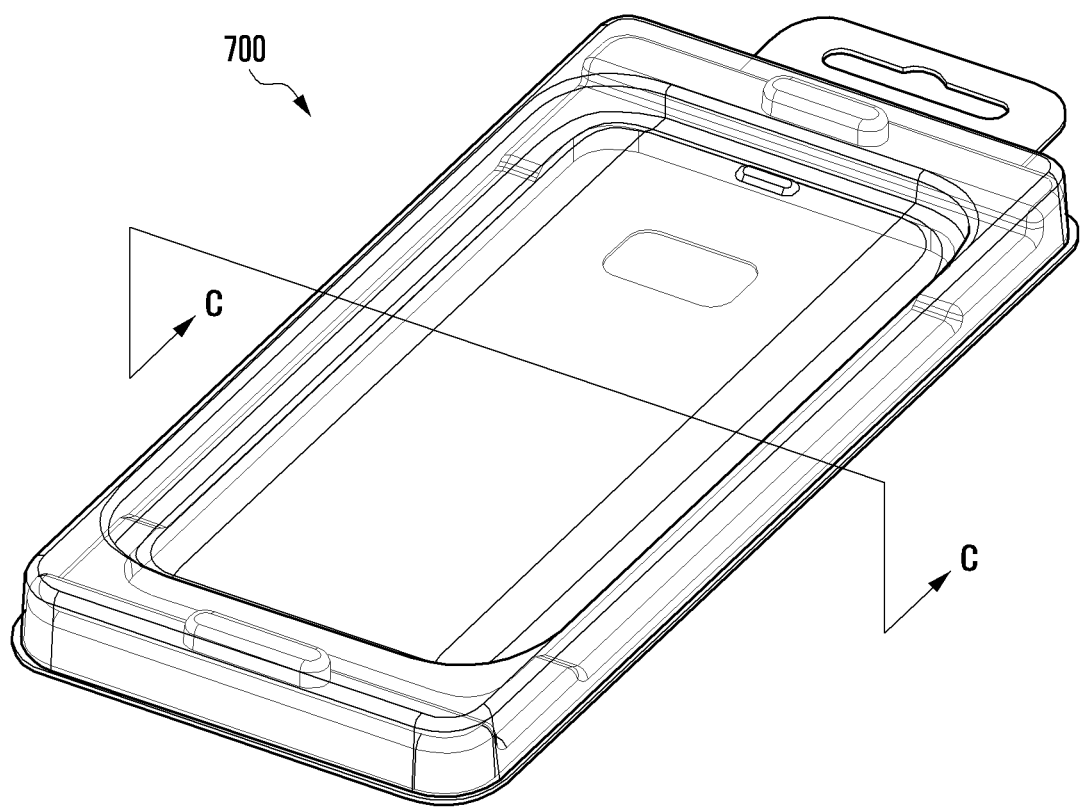
FIG. 10 illustrates a protective film attachment housing for an electronic device according further another embodiment of the present disclosure.
Figure 11:
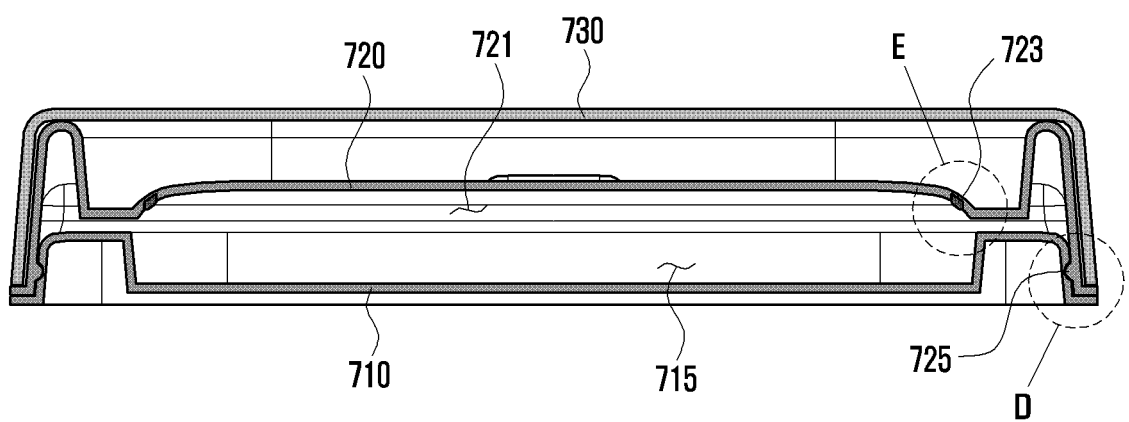
FIG. 11 is a cross sectional view of an electronic device cut along a line C-C of FIG. 10.

FIG. 10 illustrates a protective film attachment housing 700 for an electronic device according further another embodiment of the present disclosure; and FIG. 11 is a cross sectional view of an electronic device cut along a line C-C of FIG. 10.

The protective film attachment housing 700 for an electronic device illustrated in FIG. 10 may be manufactured together with the protective film in a package form.

With reference to FIG. 11, the protective film attachment housing 700 for an electronic device according to further another embodiment of the present disclosure may include an upper plate 730, middle plate 720, and lower plate 710.

According to an embodiment, the upper plate 730 may include a material for blocking penetration of an ultraviolet light, and can avoid hardening of the modified material layer 109 (refer to FIG. 3) until an interior protective film is attached to an electronic device.

According to an embodiment, the lower plate 710 may be located at a settling part 715 where the electronic device is settled. The settling part 715 can fix the electronic device because the settling part 715 is formed corresponding to a shape of a surface facing the electronic device when settling the electronic device. A location of the electronic device can be determined according a relationship between a first protruding part 711' and a second protruding part 713'.

According to an embodiment, the middle plate 720 may include a material through which an ultraviolet light can penetrate. The middle plate 720 may include a pressing part 721. If the middle plate 720 covers the electronic device in a state of settling the electronic device in the settling part 715, the pressing part 721 may deform corresponding to a shape of a surface facing the electronic device such that the protective film can be pressed and stick to the window of the electronic device while the modified material layer 109 (refer to FIG. 3) is being hardened.

FIGS. 12 to 15 illustrate a procedure of attaching a protective film 100 to an electronic device by using a protective film attachment housing 700 according to another embodiment of the present disclosure.

Figure 12:
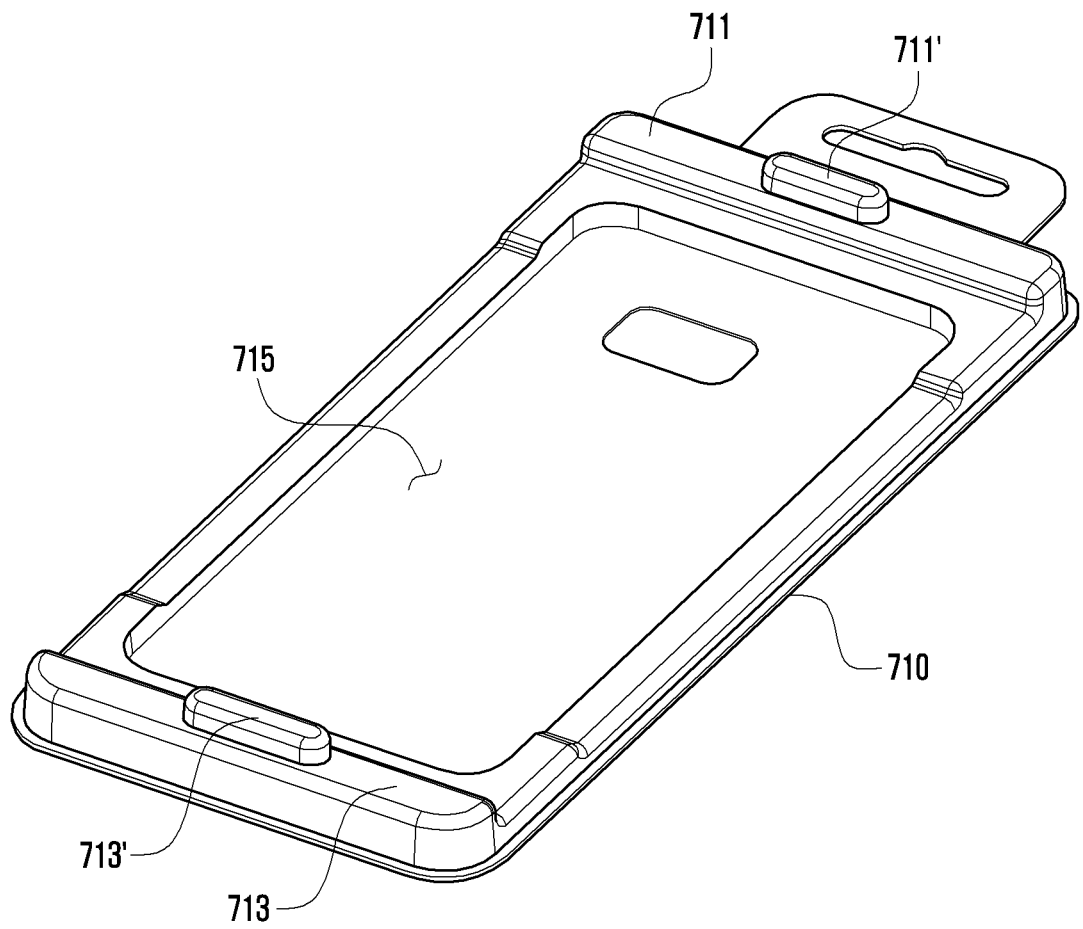
FIG. 12, FIG. 13, FIG. 14 and FIG. 15 illustrate a procedure of attaching a protective film to an electronic device by using a protective film attachment housing according to further another embodiments of the present disclosure.

FIG. 12 illustrates a lower plate 710 of a protective film attachment housing 700 for an electronic device according to an embodiment of the present disclosure.

According to the embodiment, a first base 711 or a second base 713 may be formed in the up/down direction centered by the settling part 715 for the electronic device. According to an embodiment, a first protruding part 711' or a second protruding part 713' may be formed in the first base 711 or the second base 713. For easier understanding, it has been described assuming that the first and second bases are formed in the up/down direction, however the first and second bases may be formed in the right and left direction.

According to the embodiment, the second base 713 may be formed higher than the first base 711. If the first slit 123 and the second slit 125 of the separation layer 115a and 115b (refer to FIGS. 19 and 20) are installed by inserting into the first protruding part 711' and the second protruding part 713', the protective film can be disposed by forming a slope against the window of the electronic device.

Figure 13:
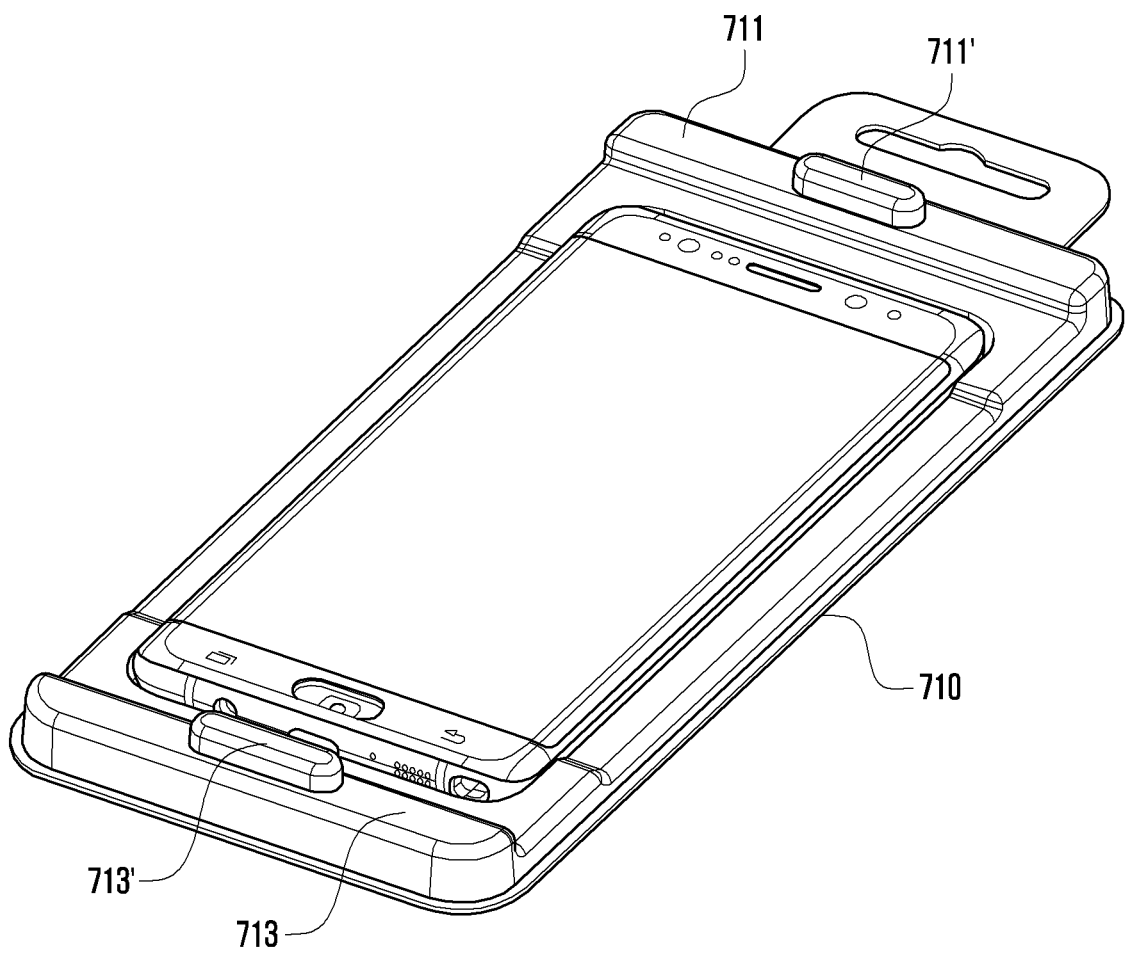
Figure 14:
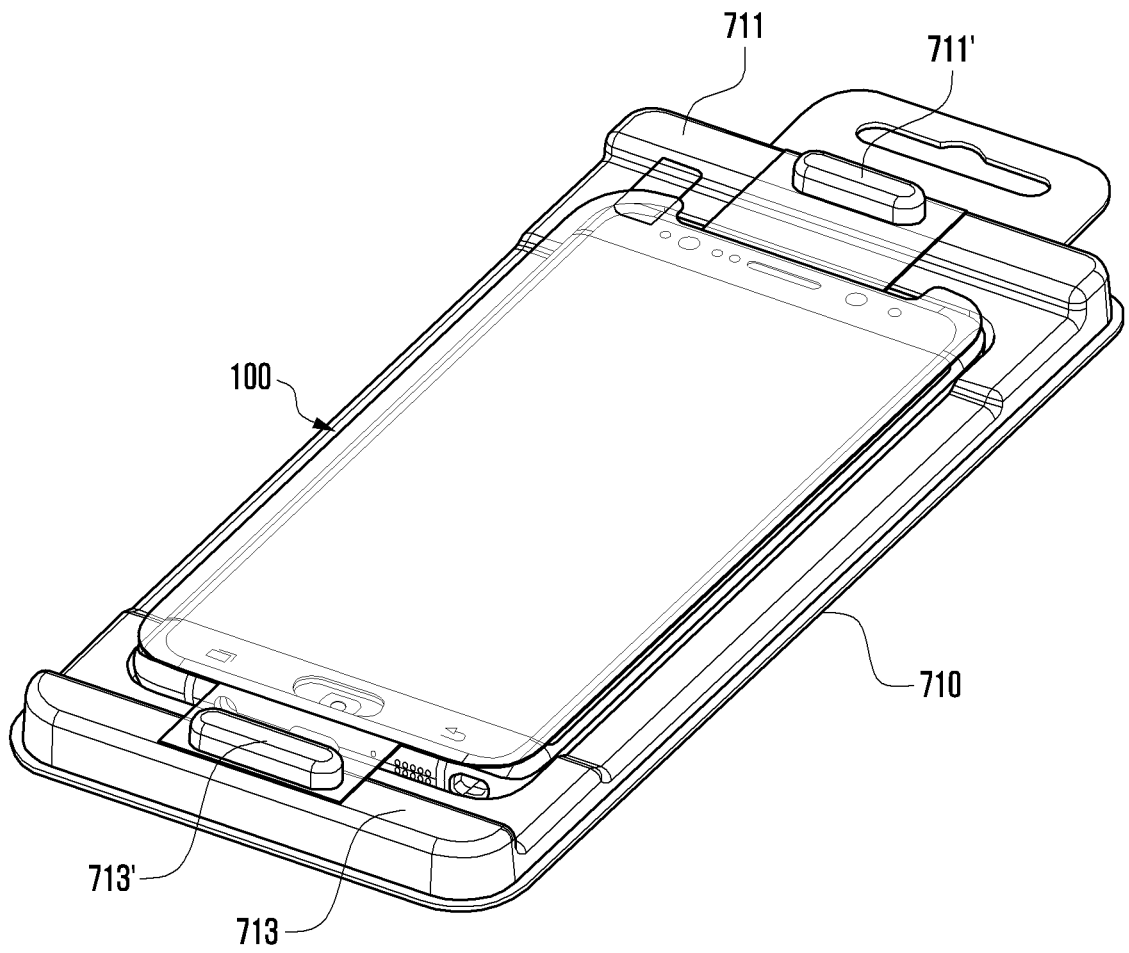

FIG. 13 illustrates a state of an electronic device settled in the settling part 715 of the lower plate 710 according to an embodiment of the present disclosure; and FIG. 14 illustrates a state that the protective film is arranged and disposed at the location of the window of the electronic device through the first protruding part 711', second protruding part 713', first slit 123, and second slit 125 (refer to FIGS. 19 and 20) according to an embodiment of the present disclosure. By this, the location of the protective film can be more easily determined against the electronic device.

Figure 15:
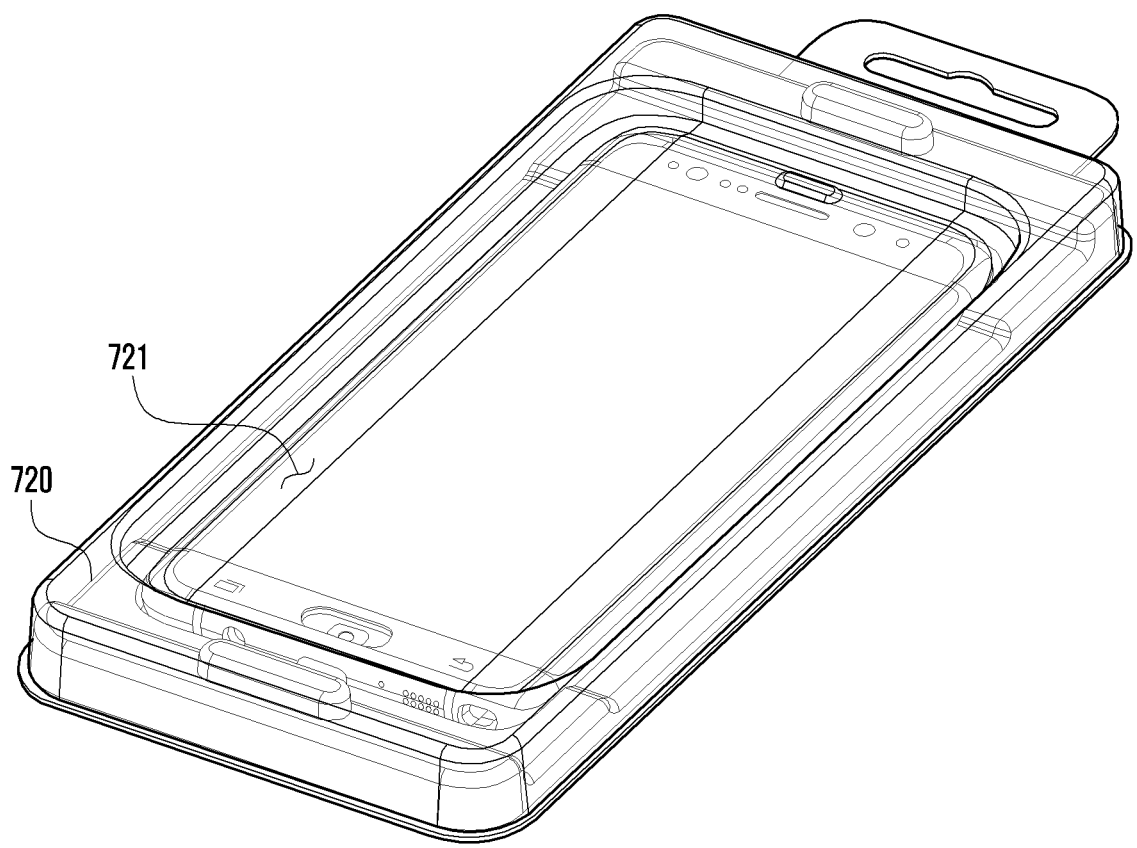

FIG. 15 illustrates a state that the middle plate 720 and the lower plate 710 are combined according to an embodiment of the present disclosure. According to the embodiment, by pressing the protective film towards the window of the electronic device through the pressing part 721 of the middle plate 720, the protective film can maintain an attached state with the window while the modified material layer is being hardened.

Figure 16:
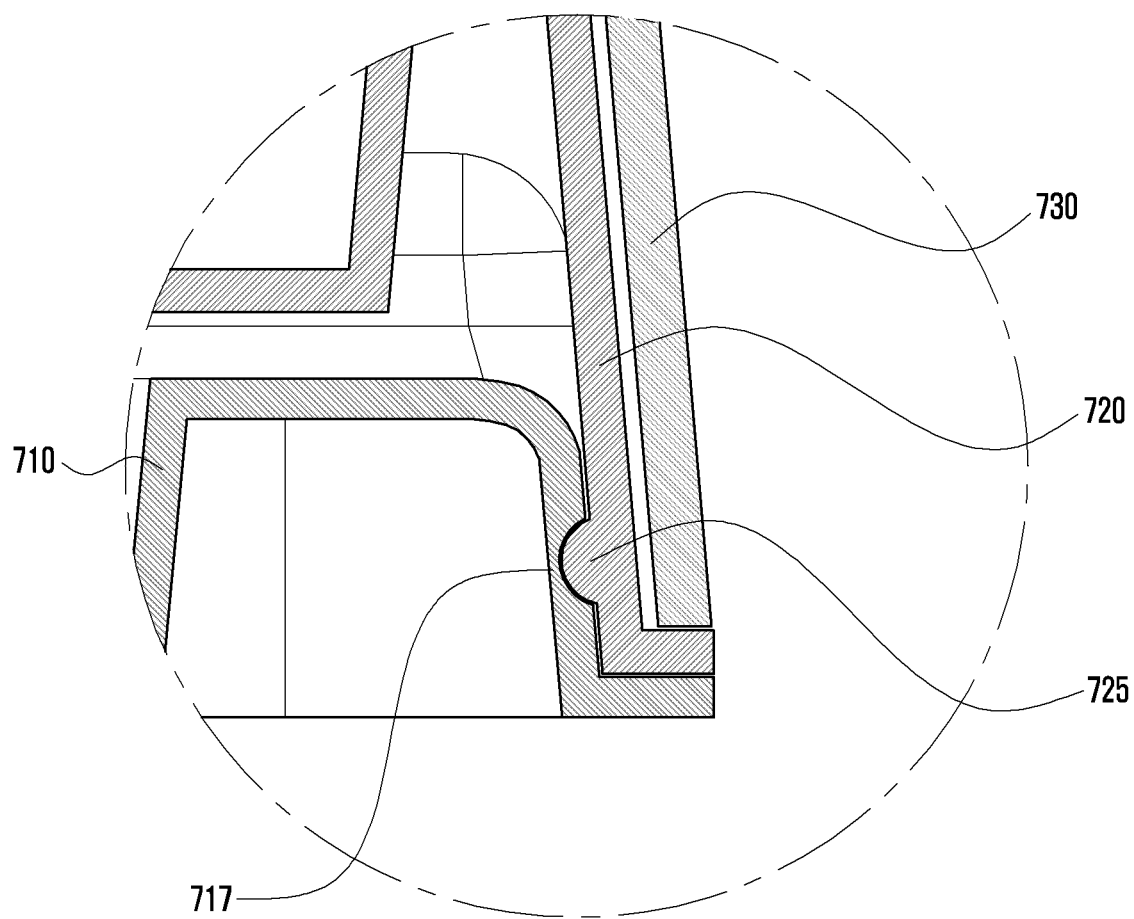
FIG. 16 is an explode view illustrating a part D of FIG. 11.

FIG. 16 is an explode view illustrating a part D of FIG. 11. According to an embodiment, the protective film attached to the electronic device can be strongly pressed because a combining strength is increased by forming a bump 725 and a groove 717 in the lower plate 710 and the middle plate 720 as shown in FIG. 16.

Figure 17:
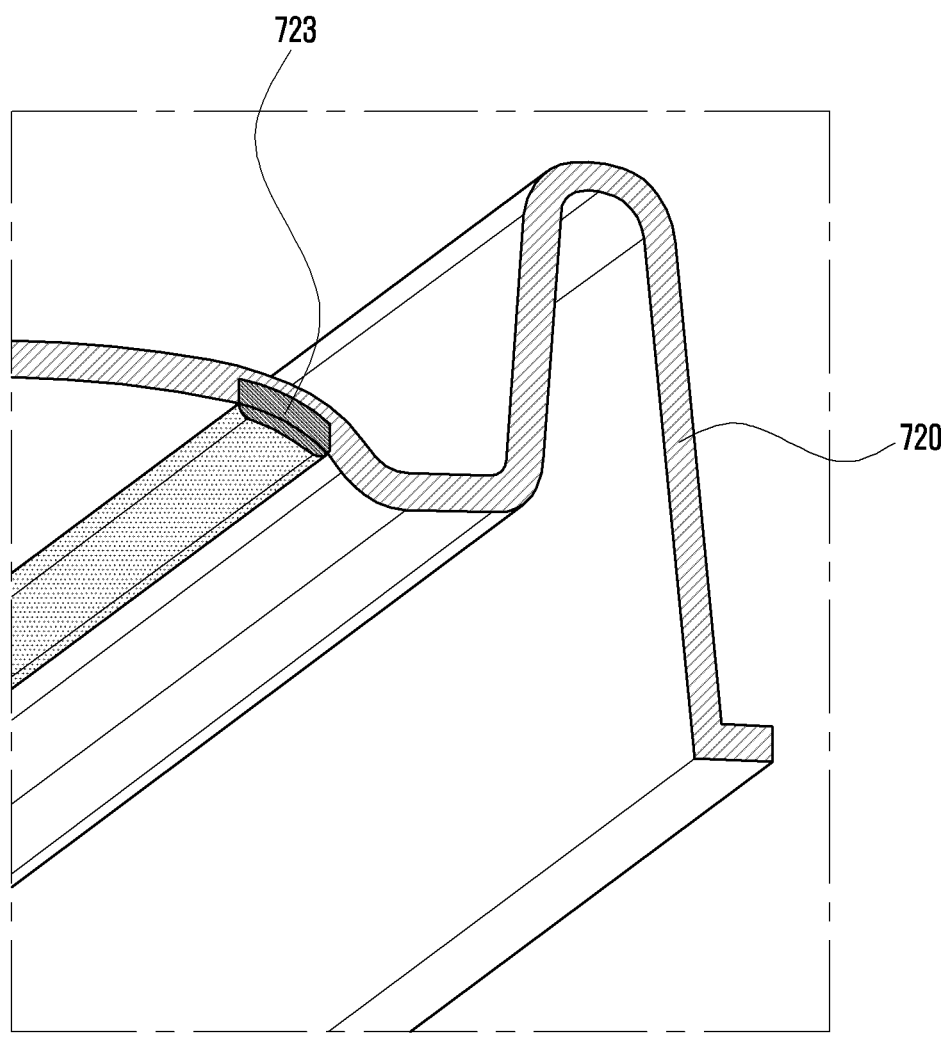
FIG. 17 is an exploded view illustrating a part E of FIG. 11.

FIG. 17 is an exploded view illustrating a part E of FIG. 11.

As shown in FIG. 17, a pressing member 723 may be provided in the pressing part 721 of the middle plate 720 corresponding to a curved part of the window of the electronic device. According to an embodiment, the pressing member 723 can make the protective film to maintain an attached state along the curved shape of the window by concentrating a force transferred from the pressing part 721 of the middle plate 720 to the protect film of the electronic device at the curved part 103 (refer to FIG. 3).

According to an embodiment, the pressing member 723 may have a structure of an elastic member additionally provided in the pressing part 721 of the middle plate 720. According to further another embodiment, the pressing member 723 may be formed integrally with the pressing part 721 of the middle plate 720 by protruding corresponding to the curved part of the window.

Figure 18:
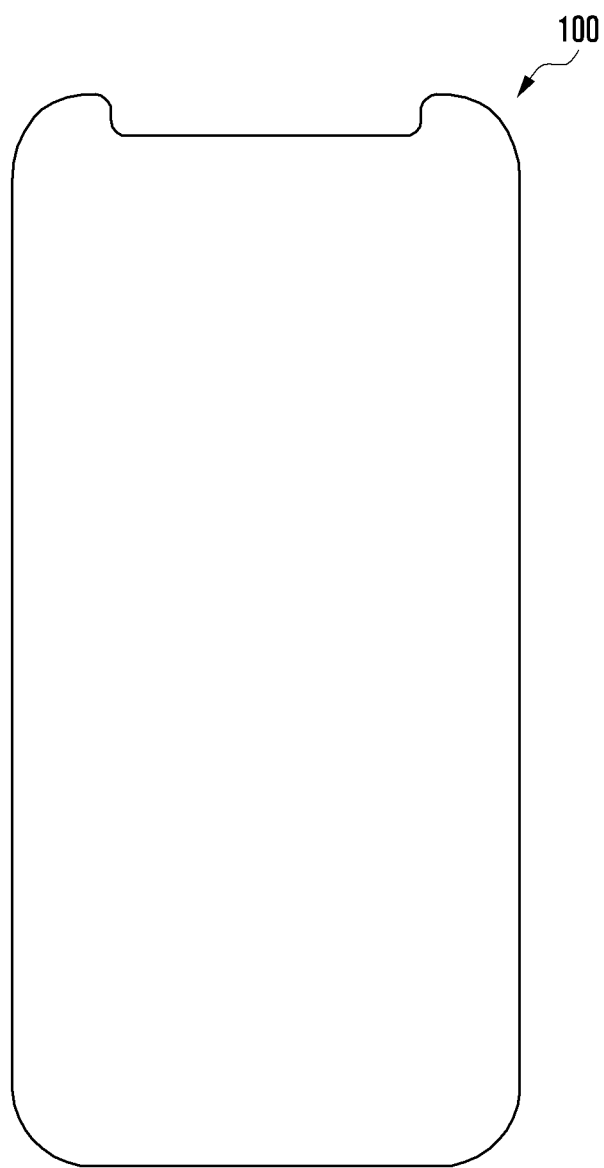
FIG. 18 illustrates a protective film for an electronic device according to an embodiment of the present disclosure.
Figure 19:
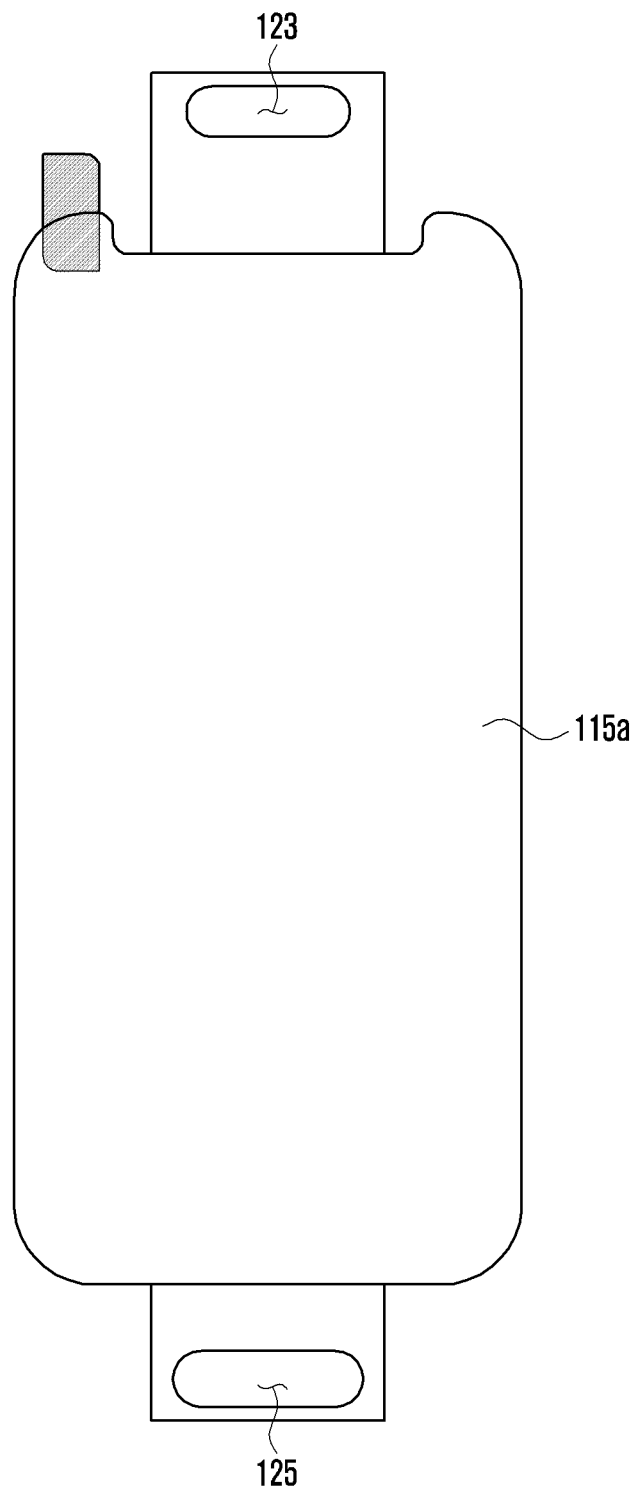
FIG. 19 and FIG. 20 illustrate a separation layer according to an embodiment of the present disclosure.
Figure 20:
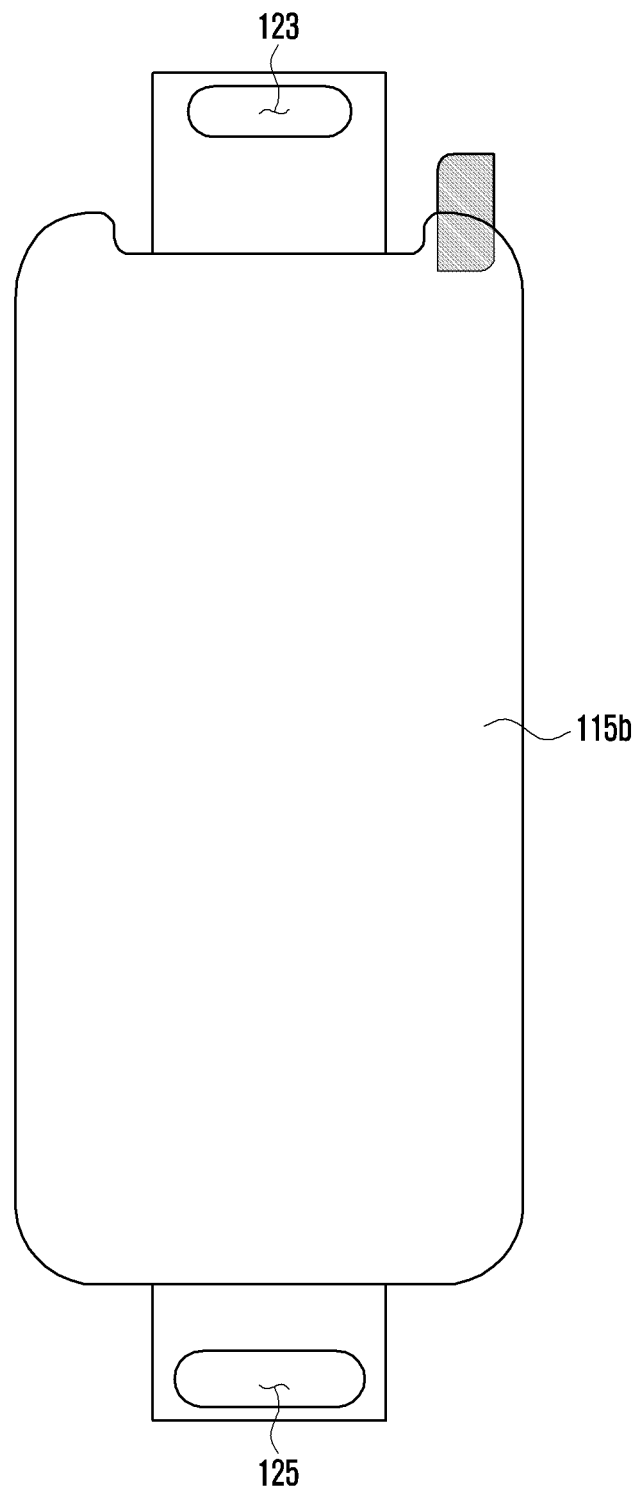

FIG. 18 illustrates a protective film for an electronic device according to an embodiment of the present disclosure; and FIGS. 19 and 20 illustrate a separation layers 115a and 115b according to an embodiment of the present disclosure.

The separation layers 115a and 115b illustrated in FIGS. 19 and 20 may be provided by combining with the front and rear surfaces of the protective film for the electronic device illustrated in FIG. 18.

According to an embodiment, a first slit 123 and a second slit 125 may be formed in the separation layers 115a and 115b corresponding to the locations of the first protruding part 711' and the second protruding part 713' of the lower plate 710 (refer to FIG. 12). If the first slit 123 and the second slit 125 are inserted into the first protruding part 711' and the second protruding part 713' (refer to FIG. 12), the location of the protective film of the electronic device may correspond to the location of the windows of the electronic device. By this, the location of the protective film can be more easily determined when attaching the protective film.

A protective film for an electronic device according to an embodiment of the present disclosure can maintain an attached state for a long period without splitting a curved part of the protective film because a restoring force of the curved part is reduced according to hardening of a modified material layer.

What is claimed is:

1. A protective film for an electronic device, the protective film comprising:
    a deformable outer layer formed with a synthetic resin;
    a deformable modified material layer configured to be attached with a lower surface of the deformable outer layer, wherein the deformable modified layer is configured to be deformed into a curved shape corresponding to a curved shape of a window surface of the electronic device prior to hardening and hardened into the curved shape responsive to receipt of an external stimuli;
    a deformable inner layer formed with a synthetic resin, attached with a lower surface of the deformable modified material layer; and
    an adhesive layer adhering to a lower surface of the deformable inner layer,
    wherein a bonding strength of the deformable modified material layer and the adhesive layer is increased due to placement of the deformable inner layer.

2. The protective film of claim 1, further comprising:
a reinforced protective layer formed on an upper surface of the deformable outer layer with a material having a higher strength than the deformable outer layer.

3. The protective film of claim 2, further comprising:
a first separation layer configured to adhere to an upper surface of the reinforced protective layer and a second separation layer configured to adhere to a lower surface of the adhesive layer in a separable form.

4. The protective film of claim 2, further comprising:
a lipophilic coating layer configured to be located on an upper surface of the reinforced protective layer.

5. The protective film of claim 2, further comprising:
a water and oil repellent coating layer configured to be located on an upper surface of the reinforced protective layer.

6. The protective film of claim 2, wherein the reinforced protective layer, the deformable outer layer, the deformable modified material layer, the deformable inner layer, and the adhesive layer are formed to have a total thickness greater than 60 μm and less than 135 μm.

7. The protective film of claim 1, wherein the external stimuli comprises ultraviolet light radiation.

8. The protective film of claim 7, wherein the deformable modified material layer comprises an acrylic resin having a glass transition point lower than room temperature, a photoreactive oligomer configured to be hardened by an ultraviolet light, and a photo-initiator configured to initiate an ultraviolet curing reaction.

9. The protective film of claim 8, wherein the deformable modified material layer comprises 100 parts by weight of the acryl resin, 5~50 parts by weight of the photo-reactive oligomer, and 1~5 parts by weight of the photo-initiator.

10. The protective film of claim 7, wherein the deformable modified material layer comprises an acrylic resin having a glass transition point lower than room temperature, methacryloyloxyethyl isocyanate, and photo-initiator configured to initiate an ultraviolet curing reaction.

11. The protective film of claim 1, wherein the deformable outer layer is formed with a thickness greater than 10 μm and less than 50 μm.

12. An electronic device comprising:
a housing;
a display disposed inside the housing and including a flat part and a curved part; and
a protective film, wherein the protective film comprises:
a deformable outer layer formed with a synthetic resin;
a deformable modified material layer attached with a lower surface of the deformable outer layer, wherein the deformable modified layer is configured to be deformed into a curved shape corresponding to a curved shape of the display prior to hardening and hardened into the curved shape responsive to receipt of an external stimuli;
a deformable inner layer formed with a synthetic resin, attached with a lower surface of the deformable modified material layer; and
an adhesive layer adhering to a lower surface of the deformable inner layer,
wherein a bonding strength of the deformable modified material layer and the adhesive layer is increased due to placement of the deformable inner layer.

13. A windows assembly for an electronic device, the window assembly comprising:
a deformable outer layer formed with a synthetic resin;
a deformable modified material layer attached to a lower surface of the outer layer, to have fluidity, wherein the deformable modified layer is configured to be deformed into a curved shape corresponding to a curved shape of a display of the electronic device prior to hardening and hardened into the curved shape responsive to receipt of an external stimuli;
a deformable inner layer formed with a synthetic resin, attached to a lower surface of the deformable modified material layer;
an adhesive layer configured to be combined with a lower surface of the deformable inner layer; and
a window layer configured to be combined with a lower surface of the adhesive layer and the electronic device,
wherein the adhesive layer provides adhesive strength to a connection of the lower surface of the deformable inner layer and the window layer, and
wherein a bonding strength of the deformable modified material layer and the adhesive layer is increased due to placement of the deformable inner layer.

14. The window assembly of claim 13, further comprising:
a reinforced protective layer formed on an upper surface of the deformable outer layer, the reinforced protected layer comprising a material having a higher strength than the deformable outer layer.

15. The window assembly of claim 14, further comprising:
a separation layer configured to adhere to an upper surface of the reinforced protective layer in a separable form.

16. The window assembly of claim 14, further comprising:
a lipophilic first coating layer located on an upper surface of the reinforced protective layer.

17. The window assembly of claim 13, wherein the external stimuli comprises ultraviolet light radiation.

18. The window assembly of claim 17, wherein the deformable modified material layer comprises an acrylic resin having a glass transition point lower than room temperature, a photo-reactive oligomer configured to be hardened by an ultraviolet light, and a photo-initiator configured to initiate an ultraviolet curing reaction.

19. The window assembly of claim 18, wherein the deformable modified material layer comprises 100 parts by weight of the acryl resin, 5~50 parts by weight of the photo-reactive oligomer, and 1~5 parts by weight of the photo-initiator.

20. The window assembly of claim 17, wherein the deformable modified material layer comprises an acrylic resin having a glass transition point lower than room temperature, methacryloyloxyethyl isocyanate, and photo-initiator configured to initiate an ultraviolet curing reaction.

* * * * *